United States Patent

[11] 3,594,835

| [72] | Inventor | William W. Wilson |
| | | Shreveport, La. |
| [21] | Appl. No. | 858,706 |
| [22] | Filed | Sept. 17, 1969 |
| [45] | Patented | July 27, 1971 |
| [73] | Assignee | Pipeline Products and Services, Inc. |
| | | Des Moines, Iowa |

[54] FLOAT DEVICE FOR PIPELINES
18 Claims, 10 Drawing Figs.

[52] U.S. Cl. ................................................. 9/8 R,
61/72.3
[51] Int. Cl. ..................................... B63b 21/00,
B63b 35/04
[50] Field of Search .......................................... 61/72.1,
72.3—.6; 9/8 R

[56] References Cited
UNITED STATES PATENTS
2,395,892  3/1946  Lontz .......................... 9/8

2,735,270  11/1952  Collins ........................ 61/72.3

Primary Examiner—Milton Buchler
Assistant Examiner—Gregory W. O'Connor
Attorney—Morton S. Adler ABSTRACT: A float to be strapped onto a section of pipe to be used in a pipeline for the purpose of facilitating the laying of the pipe in a body of water. The float is preferably of a solid buoyant material such as polystyrene and has an arcuate undercut so it will fit the pipe like a saddle. The edge at each end of the undercut is bevelled so that when the strap on one end is released while the pipe is in the water, the float will tilt on the bevel at the opposite end and automatically release from the other strap. The floats can be joined by a cord attached either to suitable hooks on the floats or extending through a longitudinal passageway in each float for expediting their retrieval when released from the pipes. The floats are adaptable to pipes of different diameters and may be stacked when not in use.

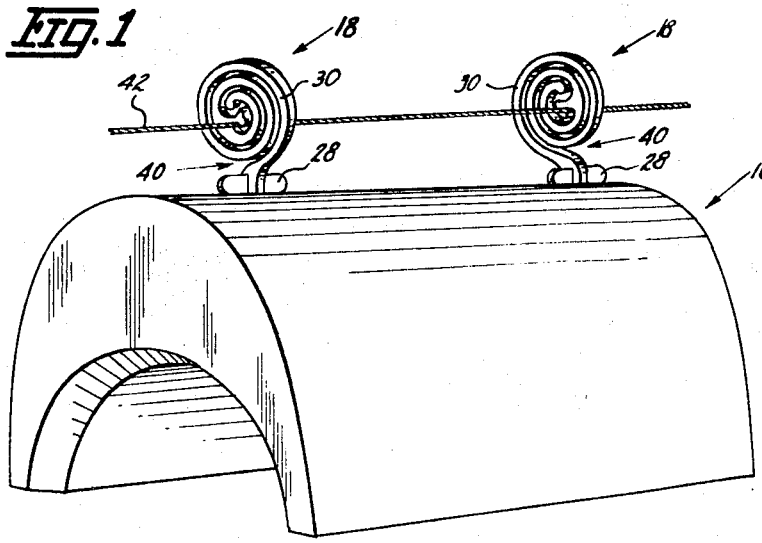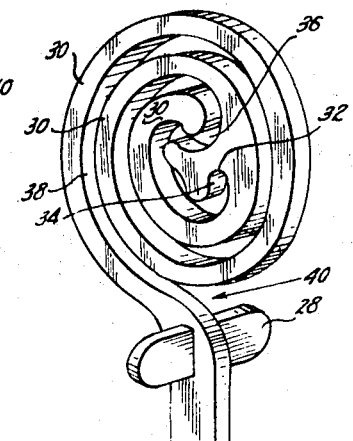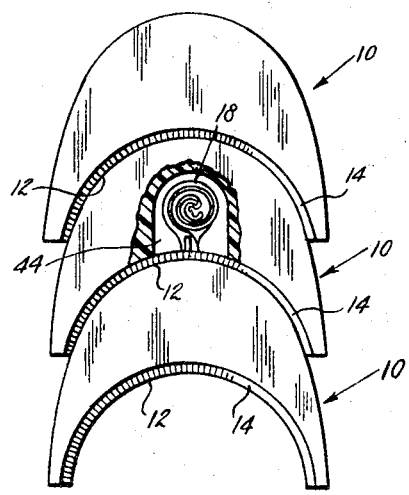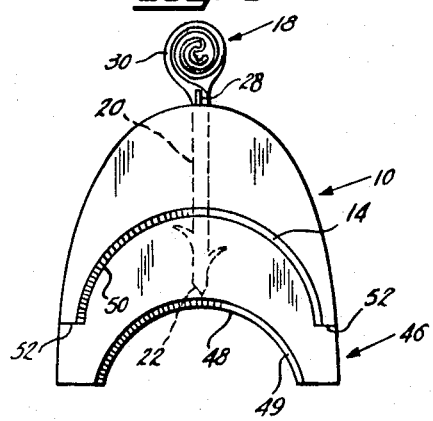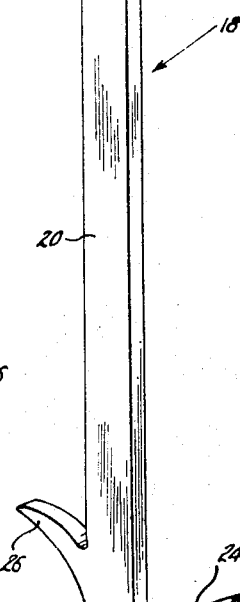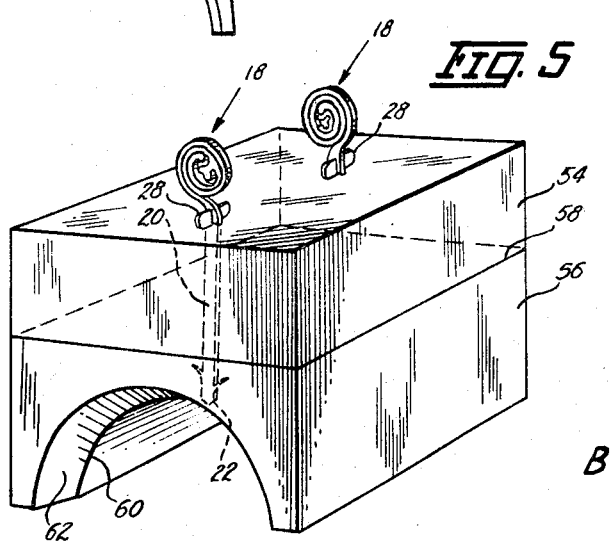

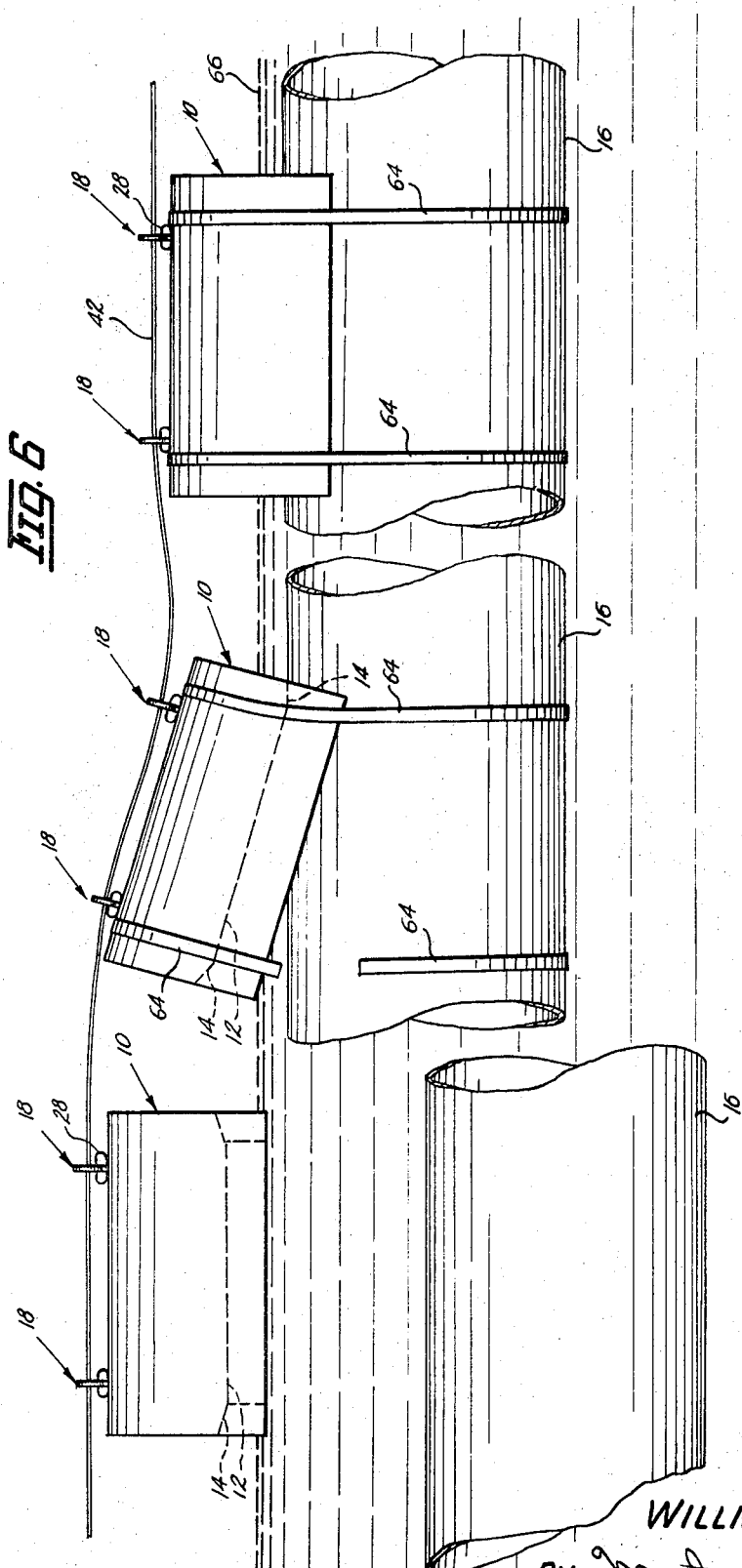

3,594,835
SHEET 3 OF 3
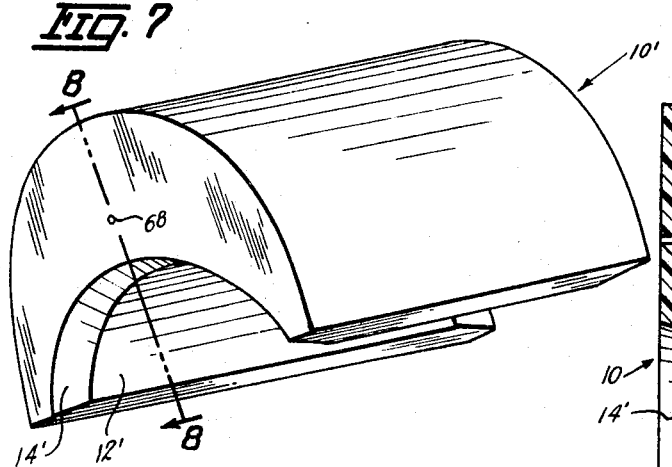
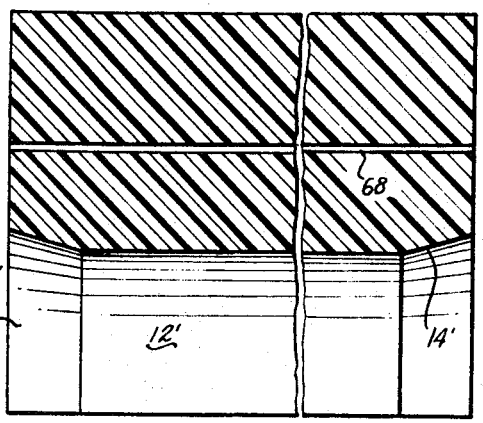
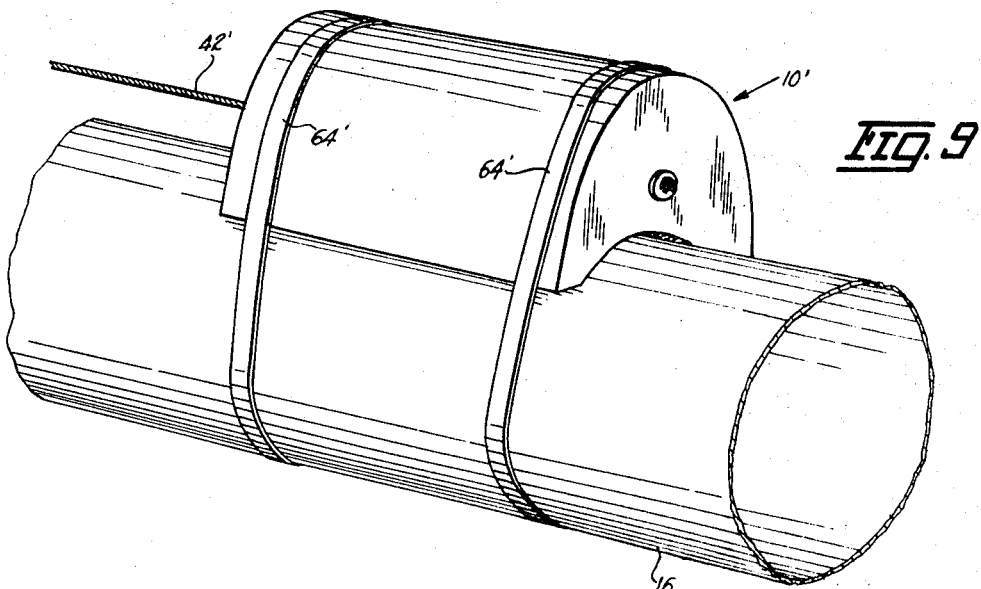
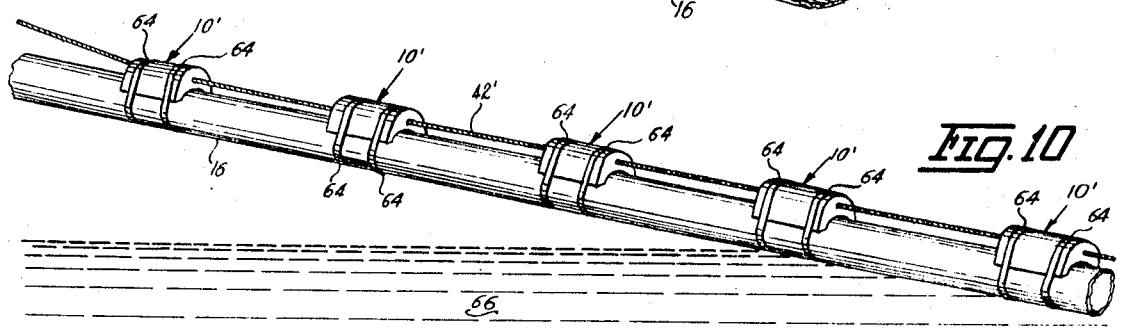
INVENTOR.
WILLIAM W. WILSON
BY
ATTORNEY.

FLOAT DEVICE FOR PIPELINES

BACKGROUND OF THE INVENTION

1. Field of the Invention

This invention relates to an improved float to be attached to a pipe section to facilitate positioning such section in a body of water.

2. Description of the Prior Art

In the construction of pipelines, there are many situations where the line must be laid across relatively large expanses of water such as bays, lakes, rivers and the like that have varying degrees of depth and also, at times, such a line is laid longitudinally of a relatively shallow water filled ditch. In such bodies of water where any navigation is involved, the pipe must be laid so that it will not interfere with that activity and for this purpose, a suitable ditch or trench is dredged along the bottom of such body of water into which the pipeline is ultimately laid. The pipes which are used may be of varying diameters and since they normally sink rapidly in water and further since there are generally relatively long expanses of water to be crossed, the pipes are provided with float devices to facilitate their handling in the water. In addition, this work requires the use of barges to carry a supply of pipe sections, float devices, binding straps and other necessary equipment. A crane may be utilized to position pipe sections in endwise alignment where they can be welded and X-rayed. Float devices are then attached to the welded section and as one weld is completed, the pipe is pushed outwardly into the water and the operation is continued as additional sections are welded.

When the pipe is to be laid in a relatively shallow water filled ditch, sufficient floats may be applied to the pipes so that they will substantially float at the surface until it is time to release the floats and permit the line to settle at the bottom. In relatively deep water where the line must be laid in a ditch at the bottom so as not to interfere with navigation, the purpose of float apparatus is to provide sufficient buoyancy as the pipe is submerged whereby it becomes more or less weightless so it can be more expeditiously handled in properly locating it in the ditch as the new sections are added and the pipe is pushed from the barge.

Illustrative of the art showing different apparatus and methods in pipeline construction in bodies of water are U.S. Pat. Nos. 375,464, 403,865, 2,735,270, 3,256,695 and 3,262,275. Such art discloses various types and forms of float devices and so far as can be determined, the type of float devices which appear to be presently in wide use for laying pipelines across water areas are 55 gallon drums which are attached to the pipe by metal straps. The average drum weighs approximately 40 pounds and approximately 10 barrels are required per 60 feet of pipe sections. When the pipe is finally in place, the attaching bands are cut and the floating drums are recovered so far as possible. Usually such drums are picked up by personnel in a boat which requires considerable dexterity. Experience has shown that many drums become lost and are not recovered because of various reasons including wind and currents with the result that they frequently become a hazard to boating and shipping. This is an important item since the number of drums used in a given location can run into the thousands.

The drums, which are in wide usage and which have generally been previously used for other purposes, frequently contain or quickly develop rust holes and punctures and since it would be extremely costly to check thousands of barrels for such leaks, the contractors will frequently strap more barrels to the pipe than would normally be required in order to compensate for those that have leaks. The cost of large numbers of drums for this purpose and the storage space for the same add materially to the costs of laying the line. In addition, many of the drums contain chemical residues that escape from the rust and puncture holes to seriously and adversely affect marine and plant life.

Experiments have been made with thin wall pipe, pontoons, innertubes and other variations in order to overcome the disadvantages of the 55 gallon drums as pointed out but such drums continue to be in common use because they are uniform in size, are easily available and expedite the floating of pipes particularly in narrow ditches.

Another disadvantage of the 55 gallon hollow drum, however, is that in water crossings where depths of 50 to 80 feet are found, such drums will collapse if they are not pressurized and if sufficient of them do collapse, this will materially increase the problems involved in locating the line within the dredged trench on the bottom. The use of pressurized apparatus is shown in the art referred to but this of necessity increases the total cost of construction.

The present invention successfully overcomes the disadvantages of prior float devices and particularly the 55 gallon drum by providing a noncontaminated solid float, preferably of polystyrene, which can be used in lesser numbers than such drums per section of pipe and which will not collapse on deep crossings. In addition, my new float weighs approximately 7½ pounds as compared with 40 pounds for the presently used metal drums.

Another important feature of the present invention is that it can be shaped to fit the pipe like a saddle and is so constructed that with two straps holding the float onto the pipe, the releasing of one strap will result in the float automatically releasing itself from the other strap.

A further advantage of the present invention is that all of the floats on a given section of pipe can be joined by a suitable cord passing either through each float or through suitable hooks on each float so that when the floats are released, their recovery is expeditiously made.

Still another novel feature of this float is its design which permits of stacking so that a large supply can be provided in a minimum of space. In addition, an adapter unit is provided so that a single size float can be used on different diameter pipes to insure that a supply of floats can always be used wherever needed.

SUMMARY

The present float is preferably an elongated member of solid buoyant material and preferably is formed of polystyrene although any comparable material may be utilized. In one embodiment, this float is generally semicircular in cross section and the under side is concave, having a radius designed generally so that the float will fit on a pipe like a saddle. The radius of the top surface is designed so as to permit of the stacking of several floats one on top of the other. The respective edge portions at each end of the concave surface are bevelled upwardly.

The float is removably secured to a section of pipeline by a suitable strap at each end portion with the strap encircling both the float and the pipe. The severing of only one strap when the pipe is in the water will cause the float to tilt on its bevelled edge at the opposite end of the cut strap and the buoyancy of the water will result in the float slipping out of the uncut strap and freeing itself from the pipe.

Recovery and collection of the released floats is accomplished in either of two ways. In one form, each float is provided with a longitudinal passageway through which a suitable cord or cable is passed so that the floats cannot escape once released and can be pulled to a collecting point. The second form includes a novel hook means which can be driven into the polystyrene float and with which a collecting cable can be suitably engaged.

An adapter component is provided to nest within the concave surface of the float and such adapter is provided with an undercut concave surface of a different diameter than that on the float so that the float with an adapter can be used on pipes of different diameter. Means are provided for securing the float to the adapter for purposes of retrieval.

A second embodiment of this float includes a preferably standard size rectangular block of a suitable solid buoyant material together with a separate base having a flat top surface and concave underside to fit a pipe. The base component is made in varying sizes for various size pipes. Means are provided for securing the block to the base used for purposes of retrieval.

The objects of this invention together with details of the operation outlined and the advantages of the same will be more fully described and developed in relation to the more detailed description of the accompanying drawings.

BRIEF DESCRIPTION OF THE DRAWINGS

FIG. 1 is a perspective view of the preferred embodiment of this new float and showing the novel retrieval cable engaging hook mounted thereon, FIG. 2 is an enlarged perspective view of the retrieval cable engaging hook used with this float, FIG. 3 is an end elevational view showing a plurality of floats in stacked relationship and having one float partly cut away in section to illustrate its construction for permitting of the stacking with one of the hook members on the float, FIG. 4 is an end view of this float shown arranged on an adapter section and illustrating the attachment of the float to the adapter by the cable hook, FIG. 5 is a perspective view showing the structure of FIG. 4 with a float and adapter but illustrating a second embodiment in the shape of these components, FIG. 6 is a three part elevational view illustrating from right to left relative position of the float and pipe from the original attachment of the float to the pipe to the severance of one of the attaching straps and the final release of the float from the pipe, FIG. 7 is a perspective view of this float showing a second embodiment where the means for engaging the retrieval cable is a longitudinal passageway through the float, FIG. 8 is a longitudinal sectional view taken on the line 8-8 of FIG. 7, FIG. 9 is a perspective view showing the float of FIG. 7 attached to a section of pipe, and FIG. 10 is a perspective view of a length of pipe showing a plurality of the floats in FIG. 7 mounted thereon and the pipe section being extended into a body of water.

DESCRIPTION OF THE PREFERRED EMBODIMENTS

Referring to the drawings, the preferred embodiment of this new float is shown in FIG. 1 and is designated generally by the numeral 10. Such float is of a solid buoyant material for which I preferably use polystyrene although it will be appreciated that any comparable material may be utilized. Float 10 is preferably elongated in shape being approximately twice as long as its height and here I have preferred to make it approximately 48 inches in length and 24 inches in height, although, it will be understood, that such dimensions may be altered.

The under side of float 10 is concave as at 12 and will have a radius designed to be complementary with the diameter of some preselected sized pipe which may be a matter of choice. At each end of float 10, the concave surface 12 is inclined or bevelled upwardly and outwardly to the end of the float as indicated at 14 for purposes which will be referred to later. Thus far described, it will be appreciated that float 10 can be mounted or fitted on to a section of pipe 16 like a saddle as best seen at the right side of FIG. 6.

A hook member 18 (FIG. 2) is preferably mounted on float 10 near each respective end thereof as seen in FIG. 1. Hook 18 comprises an elongated shank 20 which is pointed 22 at its lower end and at its lower end portion has two angularly projecting hook or bar elements 24 and 26 arranged at opposite sides of the shank 20 and in a vertical spaced relationship to each other as seen in FIG. 2. Near the upper end of shank 20 there is provided a transverse bar member 28 which serves as a stop as will appear and above bar 28, and integral with shank 20 there is a plurality of convolutions 30 which become concentrically smaller and terminate at point 32 so as to form an axial chamber or eye 34 into which there is the relatively narrow passageway or throat 36. By this arrangement, it will be seen that convolutions 30 define a passageway 38 which communicates at one end at point 40 at one side of hook 18 and at the other end with chamber 34 through the throat 36.

Hooks 18 are affixed to float 10 by driving the shank portion 20 into the float at the top and stop 28 will engage the top surface of the float and limit the depth of penetration of hook 18. The length of shank 20 is such that in the use of float 10 as described, the point 22 of the hook will not penetrate the concave surface 12. The arrangement of barbs 24 and 26 as can be appreciated are designed to prevent the accidental removal of hook 18 from float 10.

The purpose of hooks 18 is to engage a float retrieval cable 42. For this purpose it will be noted that two hooks 18 are provided on each float and are arranged relative thereto so that the entrance 40 to passageway 38 on one float is oppositely oriented relative to the corresponding entrance 40 on the other float. Cable 42 may be attached to hooks 18 at any point on their length and it is not necessary to have an end of cable 42 available for threading through hook 18. All that is required is that the cable be introduced into passageway 38 at point 40 and moved through said passageway into the chamber 34. By having two hooks 18 with oppositely disposed directions of entry for the cable, it will be appreciated that in the highly unlikely situation where cable 42 might work its way loose from one hook, it would still be engaged by the other hook since any movement of the cable permitting it to become released from one hook, would necessarily tend to assure its retention by the other.

The float 10 as described is designed so as to permit of stacking as best seen in FIG. 3. For this purpose, a well or recess 44 is formed in the concave surface 12 at each end portion of float 10 as illustrated in one of the floats in FIG. 3 to accommodate the protruding portion of hook 18. This stacking arrangement permits of the assembly of a considerable number of floats 10 in a minimum space, which is an important consideration since many thousands of such floats may be required on a particular job, and thus provides a considerable advantage in the saving of space over space presently required in assembling a sufficient number of 55 gallon drums as presently practiced. In FIG. 4, float 10 is shown arranged relative to an adapter 46 which has a concave surface 48 designed to fit a smaller diameter pipe than surface 12 on float 10 and the top arcuate surface 50 designed to next against surface 12 of float 10. Surface 50 terminates on each side of adapter 46 in the respective shoulder 52 so that float 10 may be seated upon adapter 46 as shown in FIG. 4. In this arrangement, the shank 20 of hook 18 is made long enough to penetrate adapter 46 so as to secure such adapter to the float for purposes of retrieval when the float and adapter are released from the pipe 16. The ends of surface 48 are bevelled or inclined 49 in the same manner as described for surface 14 on float 10.

In FIG. 5, there is shown a second embodiment of the float unit shown in FIG. 4 as follows. The basic portion of the float is represented by a block 54 of a solid buoyant material which is preferably of polystyrene as indicated for float 10. Block 54 is preferably rectangular and is designed for use with a base 56 having the top flat surface 58 upon which block 54 is placed. The base 56 is provided with the undercut concave surface 60 which is comparable to surfaces 12 of block 10 and 58 of the adapter 46 and is also provided with the bevelled end 62 similar to surfaces 14 and 49 described above. Float 54 is secured to base 56 by the hooks 18 in a similar manner as shown in FIG. 4. With the arrangement thus described in FIG. 5, it will be appreciated that base 56 can be designed in various sizes with relation to the surface 60 whereby the same size block 54 can be employed on different jobs using different size pipe.

With reference to FIG. 6, the use of float 10 in various stages of use is shown as follows. Viewing FIG. 6 from right to left there is shown a float 10 secured onto a pipe 16 by means of spaced metal straps 64. The method of attaching such straps is well known as similar strapping is used with the 55 gallon drums previously referred to. It will be understood that pipe 16 will have been welded at one end to another section of pipe as described and will have been moved into a body of water 66. Float 10 carries a pair of hooks 18 as described with which the retrieval cable 42 is engaged as seen in FIG. 1 and it will be understood that such cable is similarly engaged to all other hooks 18 on other floats 10 over a considerable length of pipe.

The central portion of FIG. 6 illustrates one of the straps 64 having been cut whereby the buoyancy of the water has caused float 10 at the cut end to rise so that at the opposite end where strap 64 is not cut, float 10 will have tilted upon its bevelled edge 14 in such a manner that the buoyancy of the water will cause float 10 to work itself out of the uncut strap and float free on the water as illustrated at the left portion of FIG. 6. The complete release of float 10 from pipe 16 by the cutting of only one strap is a major time saving feature when the cutting of many thousands of such straps must be undertaken. Once the floats 10 are free of the pipe, they can be retrieved with a minimum of work by means of a cable 42.

In FIGS. 7—10 I have shown a float 10' in which corresponding parts to float 10 are given the same numerals primed and which include the following modification. Float 10' is of the general similar shape as float 10 and of like material and is provided with a longitudinally extending passageway 68 which is used to receive the retrieval cord or cable 42' as best seen in FIG. 10. Cable 42' thus serves the same purpose as cable 42 but by reason of the passageway 68, the hooks 18 previously described are not required in this embodiment. Likewise, in float 10, the well 44 referred to in FIG. 3 would not be necessary. The use of cable 42' with a plurality of floats 10' on an elongated section of pipe is illustrated in FIG. 10 and the severing of one of the straps 64' produces the same result as described for the disclosure in FIG. 6.

From all of the foregoing, it is thought a full understanding of the construction and operation of this invention will be had and the advantages of the same will be appreciated.

I claim:

1. A float for providing buoyancy to a pipe in a pipeline section being laid in or across a body of water, said float comprising, a solid float member of buoyant material having a pipe engaging bottom side and a top side, the respective opposite end portions of said pipe engaging side terminating in an inclined surface extending upwardly and outwardly to the respective ends of said float member, said inclined surfaces being normally out of contact with a pipe when said float member is disposed thereon, and said float member adapted to be disposed on a pipe with said pipe engaging side in contact therewith and to be releasably attached to the pipe by the encircling engagement thereof of a releasable strap at each respective end portion of said float member so that with said pipe with attached float member being in a body of water, the releasing of one of said straps resulting in the loosened end of said float member rising so that said inclined surface on the opposite end is tilted into contact with the pipe whereby the buoyancy of said float member will permit it to slip free from the unreleased strap.

2. A device as defined in claim 1 including:
a float member retrieval line of indeterminate length, and
means on a said float member for removably attaching the same to said retrieval line.

3. A device as defined in claim 2 wherein said means for attaching said float member to said retrieval line includes said float member being provided with a longitudinal through passageway through which said retrieval line extends.

4. A device as defined in claim 2 wherein said means for attaching said float member to said retrieval line includes a retrieval line engaging hook member secured to said float member.

5. A device as defined in claim 4 wherein said hook member includes:
a retrieval line engaging portion and an integral shank portion depending therefrom, and
said shank portion being imbedded in said float member.

6. A device as defined in claim 4 including:
said hook member being disposed on the top side of said float member,
said bottom side of said float member being provided with a well, and
said float member adapted for a stacking arrangement with other like float members whereby said hook member on one float member will be disposed in the well of an adjacent ascending stacked float member.

7. A device as defined in claim 4 wherein said hook member includes:
a plurality of convolutions of a substantially rigid material,
said convolutions being in spaced relationship to each other to define a circuitous passageway from a peripheral entrance point to an axially disposed chamber, and
said convolutions providing a means for engaging a flexible line by the movement of such line at any point on its length through said passageway from said entrance point to said chamber.

8. A device as defined in claim 7 including:
a second like plurality of convolutions defining a second hook member,
said respective hook members disposed at respective opposite end portions of said float member, and
the entrance point to said passageway on each hook member being oriented perpendicularly to the longitudinal axis of said float member but oppositely oriented relative to each other.

9. A device as defined in claim 1 wherein said pipe engaging side is concave to permit said float member to be placed astraddle a selected area on a pipe.

10. A device as defined in claim 1 including:
a float adapter of solid buoyant material,
means for securing said float adapter to the pipe engaging side of said float member, and
said adapter having a pipe engaging side of like construction as that on said float member but suitable for a different size pipe than that for which said float member is designed.

11. A device as defined in claim 10 including:
a float member retrieval line of indeterminate length, and
means on said float member for removably attaching the same to said retrieval line.

12. A device as defined in claim 11 wherein said means for attaching said float member to said retrieval line includes a retrieval line engaging hook member secured to said float member.

13. A device as defined in claim 12 wherein said hook member includes:
a retrieval line engaging portion and an integral shank portion depending therefrom, and
said shank portion being imbedded in said float member and also in said adapter to serve as the means for securing said float member thereto.

14. A float device for providing buoyancy to a pipe in a pipeline section being laid in or across a body of water, said float device comprising:
a solid float member of buoyant material,
a base of solid buoyant material having a pipe engaging side,
the respective opposite end portions of said pipe engaging side terminating in an inclined surface extending upwardly and outwardly to the respective ends of said base,
said inclined surfaces being normally out of contact with a pipe when said base is disposed thereon,
said float member disposed on said base, means for securing said float member to said base, and said float member with attached base adapted to be disposed on a pipe with said pipe engaging side of said base in contact therewith and to be releasably attached to the pipe by encircling engagement thereof of a strap at each respective end portion of said float member so that with said pipe with attached float member and base being in a body of water, the releasing of one of said straps resulting in the loosened end of said float member and attached base rising so that said inclined surface on the opposite end of said base is tilted into contact with the pipe whereby the buoyancy of said float member and attached base will permit said float device to slip free from the unreleased strap.

15. A device as defined in claim 14 including:

a float member retrieval line of indeterminate length, and means on said float member for removably attaching the same to said retrieval line.

16. A device as defined in claim 15 wherein said means for attaching said float member to said retrieval line includes a retrieval line engaging hook member secured to said float member.

17. A device as defined in claim 16 wherein said hook member includes:

a retrieval line engaging portion and an integral shank portion depending therefrom, and said shank portion being imbedded in said float member and also in said base to serve as the means for securing said float member to said base.

18. A device as defined in claim 14 wherein the pipe engaging side of said base is concave to permit said base to be placed astraddle a selected area on a pipe.